(12) United States Patent
Bellegarda et al.

(10) Patent No.: US 6,208,971 B1
(45) Date of Patent: Mar. 27, 2001

(54) METHOD AND APPARATUS FOR COMMAND RECOGNITION USING DATA-DRIVEN SEMANTIC INFERENCE

(75) Inventors: Jerome R. Bellegarda, Los Gatos; Kim E. A. Silverman, Mountain View, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/183,070

(22) Filed: Oct. 30, 1998

(51) Int. Cl.[7] .................................................. G10L 15/22
(52) U.S. Cl. ........................................... 704/275; 704/251
(58) Field of Search ..................................... 704/251, 275

(56) References Cited

U.S. PATENT DOCUMENTS 5,652,897 * 7/1997 Linebarger et al. ...................... 704/4
5,774,859 * 6/1998 Houser et al. ......................... 704/275
6,023,676 * 2/2000 Erell ..................................... 704/241

OTHER PUBLICATIONS

J. Caminero–Gill, et al., "Data–Driven Discourse Modeling for Sematic Interpreting," Proc. IEEE ICASSP 96, vol. 1, pp. 401–404, Apr. 1996.*

Jerome R. Bellegarda, "A Multispan Language Modeling Framework for Large Voculary Speech Recognition," IEEE Trans. Speech and Audio Processing, vol. 6, No. 5, pp. 456–467, Sep. 1998.*

Deerwester, S. et al. "Indexing By Latent Semantic Analysis, "Journal of the American Society for Information Science, Vol. 41, No. 6, Sep. 1990, pp. 391–407.

Jelinek, F., "Self–Organized Language Modeling For Speech Recognition," Language Processing For Speech Recognition, Continuous Speech Recognition Group, IBM T. J. Watson Research Center, Yorktown Heights, N.Y., pp. 450–506, in Readings in Speech Recognition, ed. by Alex Waibel and Kai Fu Lee, Morgan–Kzufmann, 1990.

* cited by examiner

Primary Examiner—David R. Hudspeth
Assistant Examiner—Tālivaldis Ivars Smits
(74) Attorney, Agent, or Firm—Blakely, Sokoloff, Taylor & Zafman

(57) ABSTRACT

A method and apparatus for command recognition using data-driven semantic inference includes recognizing a sequence of words received as the voice command. Data-driven semantic inference is then used with the recognized sequence of words to recognize the voice command. Thus, the command is identified on the basis of the semantics of words of the spoken command rather than the particular grammar of each of predetermined different ways the command could be worded.

24 Claims, 5 Drawing Sheets

METHOD AND APPARATUS FOR COMMAND RECOGNITION USING DATA-DRIVEN SEMANTIC INFERENCE

BACKGROUND OF THE INVENTION

1. Field of the Invention

The present invention pertains to pattern recognition. More particularly, this invention relates to command recognition using data-driven semantic inference.

2. Background

As computer systems have evolved, the desire to use such systems for pattern recognition has grown. Typically, the goal of pattern recognition systems is to quickly provide accurate recognition of input patterns. One type of pattern recognition system is a voice recognition system, which attempts to accurately identify a user's speech. Additionally, one type of voice recognition system is a command or control recognition system. Command/control recognition systems allow a user to input voice commands and selections to the system rather than requiring use of a keyboard, mouse, or similar device.

Typically, the goal of command/control recognition systems is to accurately recognize verbal commands identifying system instructions. One solution to providing command/control interpretation systems is to use a finite state grammar model. Such a model requires the system designer to identify many different ways that each command or instruction could be worded (e.g., different ways in which a user could ask the system to identify the current time include "What time is it?", "What is the time?", "Tell me the time.", etc.). Each of these different ways is programmed into the system and, using the finite state grammar model, the particular grammar of each of these different ways the command could be worded is used in identifying the voice command input by a user. However, such systems are not very adaptable because they do not allow for additional ways to word instructions other than what is programmed into the system. Rather, the recognition process is limited by the grammar programmed into the system. Thus, such systems tend to be user-unfriendly because they typically require a user to memorize particular command phrases.

Thus, what is needed is an improved way to recognize commands.

SUMMARY OF THE INVENTION

A method and apparatus for command recognition using data-driven semantic inference is described herein. According to one aspect of the present invention, a method for recognizing a voice command comprises recognizing a sequence of words received as the voice command. Data-driven semantic inference is then used with the recognized sequence of words to recognize the voice command.

According to one aspect of the present invention, a machine-readable medium has stored thereon a plurality of instructions that, when executed by a processor, cause the processor to recognize a voice command by recognizing a sequence of words received as the voice command, and using data-driven semantic inference with the recognized sequence of words to recognize the voice command.

According to one aspect of the present invention, an apparatus for recognizing a voice command includes a speech recognizer and a semantic classifier. The speech recognizer is to recognize a sequence of words received as the voice command, and the semantic classifier to use data-driven semantic inference with the recognized sequence of words to recognize the voice command.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus for command recognition using data-driven semantic inference. An audio input is initially provided to a speech recognizer that identifies the words in the input. These recognized words are then provided to a semantic classifier that, using a large-span semantic language model and semantic anchors created using training data, classifies the input as corresponding to a particular command. The appropriate action, based on the particular command, can then be generated.

Figure 1:
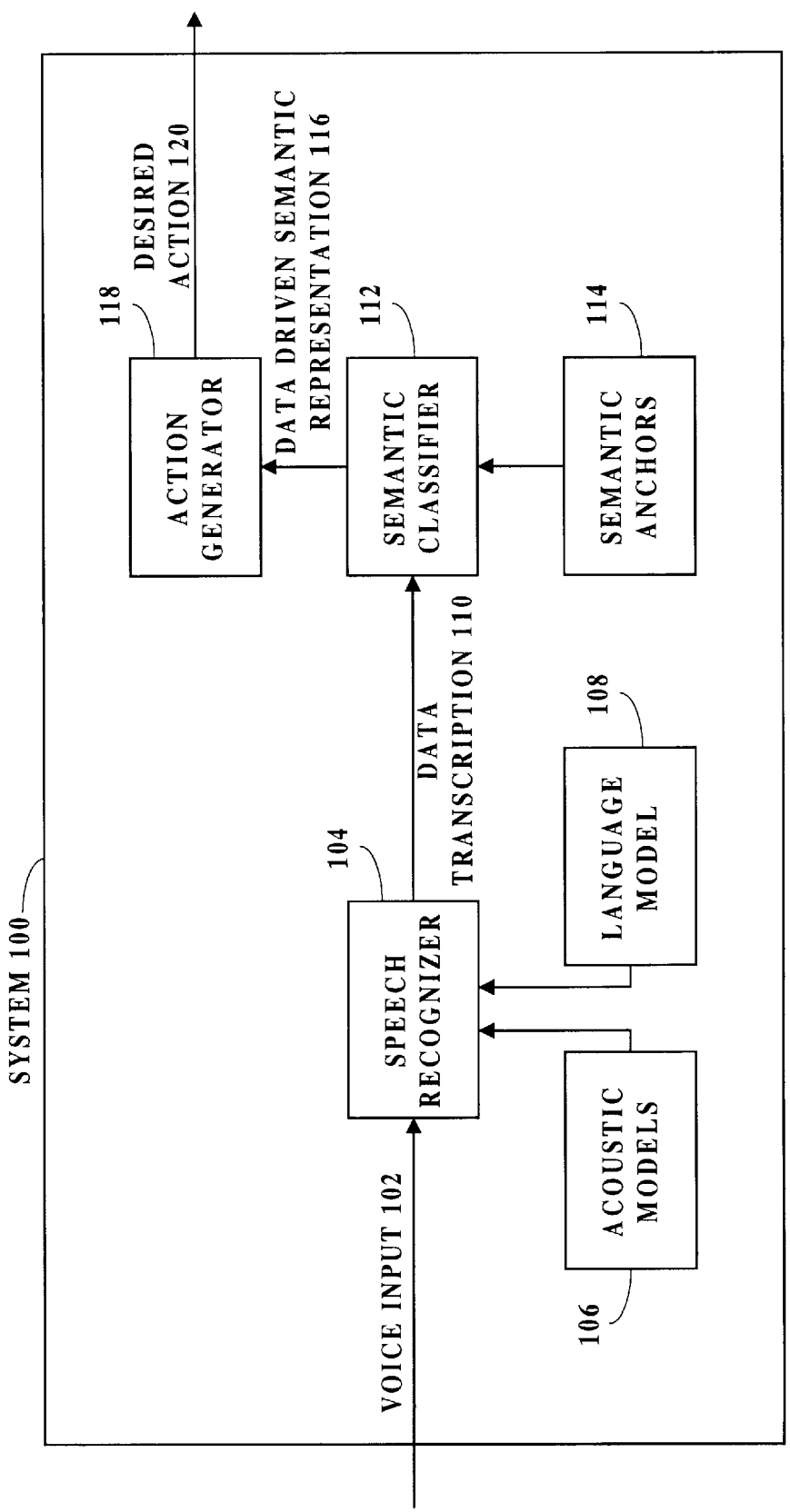
FIG. 1 is a block diagram illustrating a voice command recognition system according to one embodiment of the present invention.

FIG. 1 is a block diagram illustrating a voice command recognition system according to one embodiment of the present invention. As illustrated, voice input 102 is provided to a speech recognizer 104 of command recognition system 100. Voice input 102 is the audio data that is input to command recognition system 100 and is intended to represent any type of audio data. Typically, voice input 102 will be the digitized representation of an input command (e.g., a series of words) spoken by an individual.

Speech recognizer 104 operates in a conventional manner, using acoustic models 106 and language model 108 to recognize the words in voice input 102. According to one embodiment of the present invention, acoustic models 106 are hidden Markov models, and language model 108 is a conventional n-gram language model (such as a bigram model, where n=2), where the probability of every word depends only on the n previous words. Alternate embodiments can use different types of language models, and any of a variety of conventional language models other than finite state grammar models can be used. Hidden Markov models and n-gram language models are well-known to those skilled in the art and thus will not be discussed further except as they pertain to the present invention.

Speech recognizer 104 outputs a data transcription 110, which is a sequence of recognized words from voice input 102. Speech recognizer 104 may group the words of a particular command and forward them all together to semantic classifier 112, or alternatively may provide individual words to semantic classifier 112 as they are recognized. Semantic classifier 112 uses data transcription 110 in conjunction with semantic anchors 114 to identify the command that was input to system 100. Semantic anchors 114 are established during training of system 100, as discussed in more detail below. Semantic classifier 112 identifies a data-driven semantic representation 116 of the data transcription 110, and provides representation 116 to action generator 118.

According to one embodiment of the present invention, different commands are separated from one another based on detected pauses between words. In this embodiment, if silence is detected for greater than a threshold period of time, then the silence is interpreted as a pause between commands. Typical values for this threshold period of time range from 300 milliseconds to 3 seconds. In the illustrated implementation, speech recognizer 104 detects the pauses and indicates to semantic classifier 112 which groups of words of data transcription 110 comprise commands (e.g., by sending a signal to classifier 112, or by grouping words of a command together (e.g., by using a linked list)). Alternatively, other methods could be used to identify the beginning and/or ending of a command, such as a manual input from a user (e.g., selection of a particular box via a graphical user interface and a pointer).

Action generator 118 uses representation 116 to determine the proper action that is to be taken in response to the input command, and outputs the desired action 120. According to one embodiment, action generator 118 maintains a mapping of possible representations 116 to actions to be taken (e.g., system commands to display time, open files, close applications, etc.). It is to be appreciated that a wide range of commands can be supported by the system 100, with the exact nature of the commands being dependent on the environment where system 100 is used. Action generator 118 is well-known to those skilled in the art, and thus will not be discussed further except as it pertains to the present invention.

Figure 2:
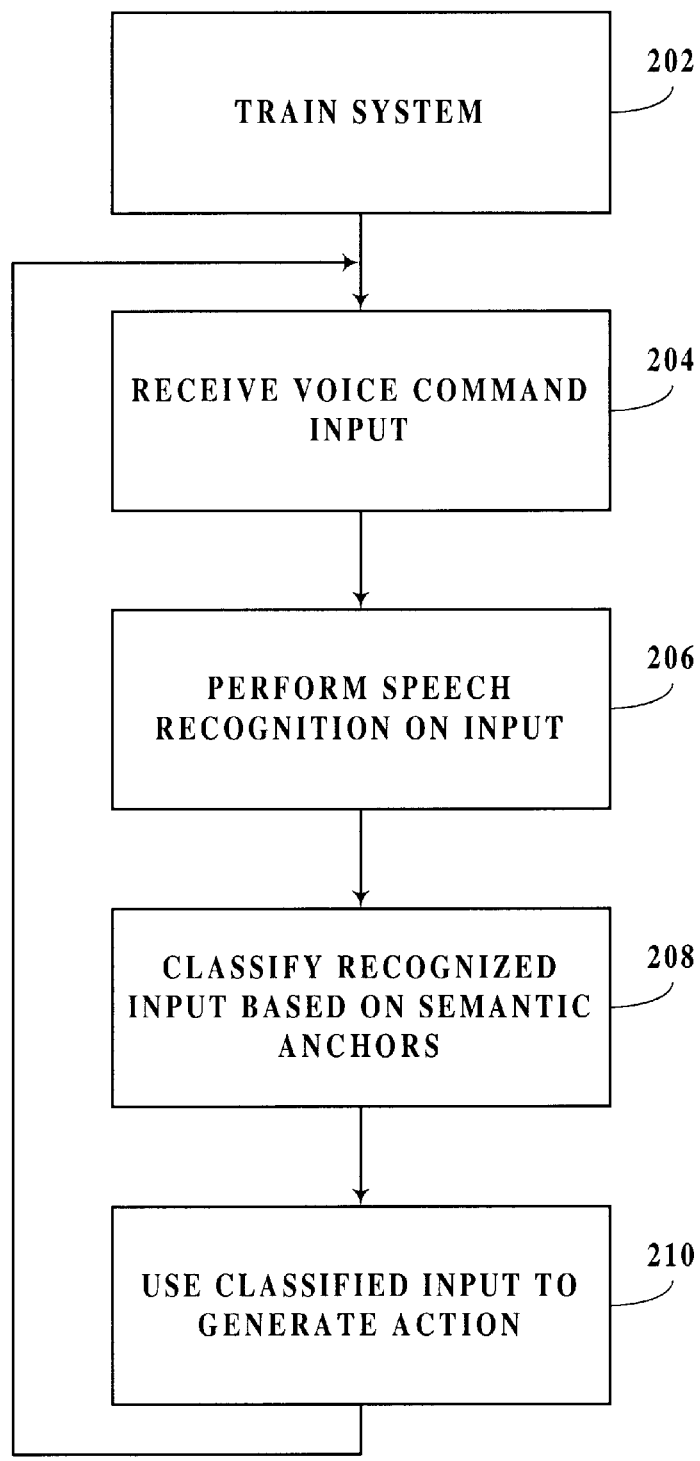
FIG. 2 is a flowchart illustrating the process followed in recognizing voice commands according to one embodiment of the present invention.

FIG. 2 is a flowchart illustrating the process followed in recognizing voice commands according to one embodiment of the present invention. Initially, the voice command recognition system is trained, step 202. This training can be done by the manufacturer (e.g., entering training data when the system is built) and/or by the user (e.g., the user speaking in the training data). In the illustrated embodiment, once the system is initially trained, no further training is necessary for command recognition. However, additional training may optionally be performed by a user, such as to customize the system to a particular user's voice.

After the system is trained, a voice command input is eventually received, step 204. The voice command input is then recognized by the speech recognizer, step 206. The recognized input (e.g., the words of the input command) is then classified by the semantic classifier, step 208. This classification process identifies, based on the semantic anchors, which command was actually input. The classified input is then used by the action generator to carry out the desired action, step 210. As discussed in more detail below, the classification performed by the classifier (e.g., semantic classifier 112 of FIG. 1) is based on the semantics or actual words that are part of the command rather than the grammar of the command.

Figure 3:
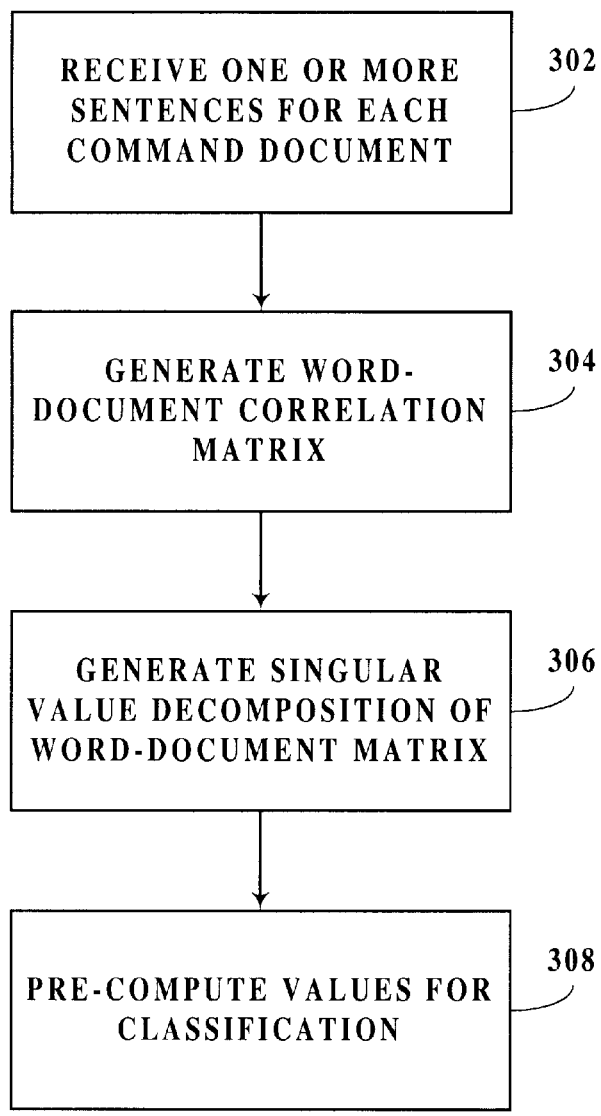
FIG. 3 is a flowchart illustrating the process of training the command recognition system according to one embodiment of the present invention.

FIG. 3 is a flowchart illustrating the process of training the command recognition system according to one embodiment of the present invention. According to one implementation, FIG. 3 illustrates the process of step 202 of FIG. 2 in more detail. Training data is entered into the system and mapped to a vector space having a particular dimension. For ease of explanation, in the discussions to follow the training data is referred to as sentences. However, it is to be appreciated that the training data can be sentences, phrases, or other word groupings. Instances of such units associated with a particular command form what is referred to as a "document" pertaining to that command. In the illustrated embodiment, the mapping is performed using a modification of a paradigm first formulated in the context of information retrieval, called latent semantic analysis, which relies on a singular value decomposition of a word-document correlation matrix.

The word-document correlation matrix tabulates the number of times each word occurs in each document. Assuming that the training database includes K documents and a total of M different words, and assuming that the words form the rows of the matrix and the documents form the columns, then each element (i,j) of the word-document matrix indicates how many times the corresponding word $M_i$ occurs in the document $K_j$. Each document from a column of the matrix can be represented as a single vector containing M values, with the resulting vectors defining a mapping between the vocabulary and a vector space of dimension M. As discussed in more detail below, this mapping can be refined by performing a singular value decomposition of the matrix, in which case the vector space is reduced to a dimension R, where R<M.

As illustrated in FIG. 3, one or more sentences for each command document are first received, step 302. A "command document" refers to a collection of one or more sentences, phrases, or other word groupings all intended to identify the same command. For example, a command document for the command to display the current time could include the word groupings "tell me what time it is", "what time is it", "display time", etc.

The word-document correlation matrix is then generated, step 304. As indicated above, the word-document correlation matrix is generated by determining the number of times each of the M words occurs in each of the K command documents. By way of example, if the command document for the command to display the current time includes the word groupings "tell me what time it is", "what time is it", and "display time", then the counts of the number of times each of the M words in the word-document matrix for the command to display the current time are illustrated in Table I. Counts for all other words in the word-document matrix for the command to display the current time are zero.

TABLE I

| Word | Count |
|---|---|
| display | 1 |
| is | 2 |
| it | 2 |
| me | 1 |
| tell | 1 |

TABLE I-continued

| Word | Count |
|---|---|
| time | 3 |
| what | 2 |

A singular value decomposition of the word-document matrix having an order of decomposition of R is then generated, step 306. The value of R can vary depending on the values of M and K, and by balancing computational speed (associated with lower values of R) against accuracy (associated with higher values of R). Typical values for R range from 5 to 50. The singular value decomposition is generated according to the following calculation:

$$W = USV^T \quad (1)$$

where U represents the M×R matrix of left singular vectors, $V^T$ represents the transposition of the K×R matrix of right singular vectors, and S represents the R×R diagonal matrix of singular values. The generation of the left and right singular vectors, as well as the diagonal matrix of singular values, is well-known to those skilled in the art and thus will not be discussed further.

Given the singular value decomposition from calculation (1), a particular document $d_j$ of W can be determined based on the jth right singular vector $V_j$ according to the following calculation:

$$d_j = USv_j^T \quad (2)$$

Further, based on calculation (2) and using well-known mathematical functions and properties, the value of the jth right singular vector $v_j$ can be calculated according to the following:

$$v_j = d_j^T US^{-1} \quad (3)$$

It is to be appreciated that the value $US^{-1}$ does not change for different values of j, and therefore the value $US^{-1}$ can be pre-calculated, step 308, and used during classification of input values as discussed in more detail below. This pre-calculation reduces the computation required during command classification, thereby increasing the speed of the command recognition system during operation.

Thus, from the training data a large-span semantic vector space having a dimension R is created. Each document from the training data results in a different semantic anchor within that vector space. Furthermore, each of the semantic anchors is based on the actual words of the training data rather than the grammar used in the training data. The semantic anchors are used in classifying input data as a particular command, as discussed in more detail below.

Figure 4:
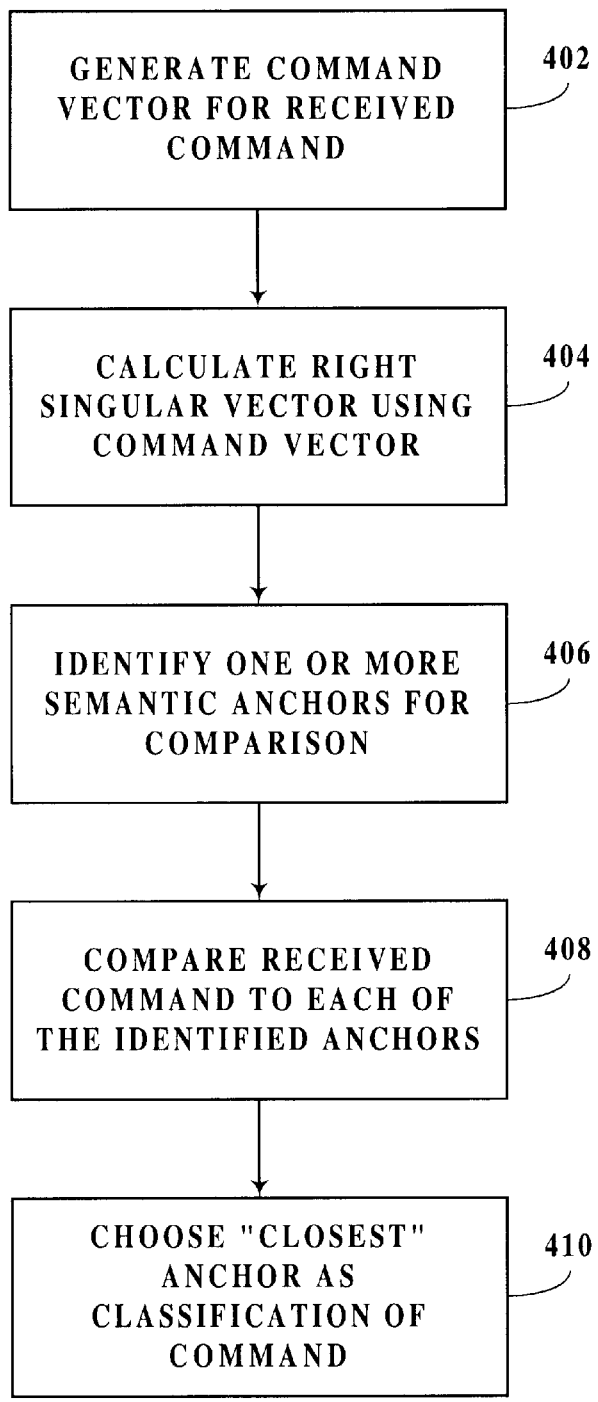
FIG. 4 is a flowchart illustrating the process followed in classifying voice input according to one embodiment of the present invention.

FIG. 4 is a flowchart illustrating the process followed in classifying voice input according to one embodiment of the present invention. According to one implementation, FIG. 4 illustrates the process of step 208 of FIG. 2 in more detail. As illustrated, a vector is first generated for the received command, step 402.

When the word(s) of a new command are received from the speech recognizer, the semantic classifier creates a new command vector $d_p$ of order M that identifies the number of occurrences of each of the M words in the new data transcription, step 402. The classifier then determines the value of the right singular vector $v_p$ corresponding to this new data transcription, step 404, according to the following calculation (similar to calculation (3) discussed above):

$$v_p = d_p^T US^{-1} \quad (4)$$

As discussed above, $US^{-1}$ is pre-computed. Therefore, the only computation which occurs at this step is the matrix multiplication of $d_p^T$ by the pre-computed value $US^{-1}$. The result of calculation (4), $v_p$, is a representation of the new data transcription in the vector space R.

The classifier then identifies one or more semantic anchors to be used for comparison to the vector $v_p$, step 406. According to one embodiment of the present invention, all of the anchors generated from the training data are used for comparison, and thus all are identified in step 406. Alternatively, the vectors can be clustered into different groups, each including a subset of the anchors from the training data. Any of a variety of clustering algorithms, such as bottom-up clustering, can be used. Clustering algorithms are well-known to those skilled in the art, and thus will not be discussed further except as they pertain to the present invention.

The classifier then compares the representation of the new data transcription ($v_p$) to one or more of the different anchors in the vector space previously calculated from the training data, step 408. A "distance" between the new data transcription vector and each of the one or more vectors is then determined, with the "distance" representing the similarity between the vectors. Two vectors which are similar have a small distance between one another, whereas vectors which are less similar have larger distances between one another. The classifier assigns the new data transcription vector to the training vector that is closest to the new vector, step 410.

The distance between the new data transcription vector $v_p$ and a vector $v_j$ from the training data can be calculated in a variety of different manners. According to one embodiment of the present invention, the distance z between the new data transcription vector $v_p$ and a vector $v_j$ from the training data is determined by calculating the inverse cosine of the similarity between $v_p S$ and $v_j S$ according to the following calculation:

$$z = \cos^{-1} \frac{v_p S^2 v_j^T}{\|v_p S\| \|v_j S\|}$$

According to an alternate embodiment of the present invention, the distance z between the new data transcription vector $v_p$ and one of the vectors $v_j$ from the training data is determined by calculating the Euclidean distance between the two vectors according to the following calculation:

$$z = \sqrt{\sum_{i=1}^{R} ((v_p)_i - (v_j)_i)^2}$$

The comparison process in steps 408 and 410 can be accomplished in a variety of manners. According to another embodiment, comparisons for all of the identified anchors are made and the anchor that is most similar to the data transcription vector $v_p$ is selected. According to an alternate embodiment, as soon as an anchor that is less than a threshold distance from the data transcription vector $v_p$ is discovered, the comparison process ends and that anchor is determined to be the "closest" in step 410.

Thus, as can be seen in FIG. 4, the classification of the input command is performed using a data-driven semantic inference. It is a representation of the words of the command that is compared to the representations of the words of the commands in the training data in order to classify the input.

Figure 5:
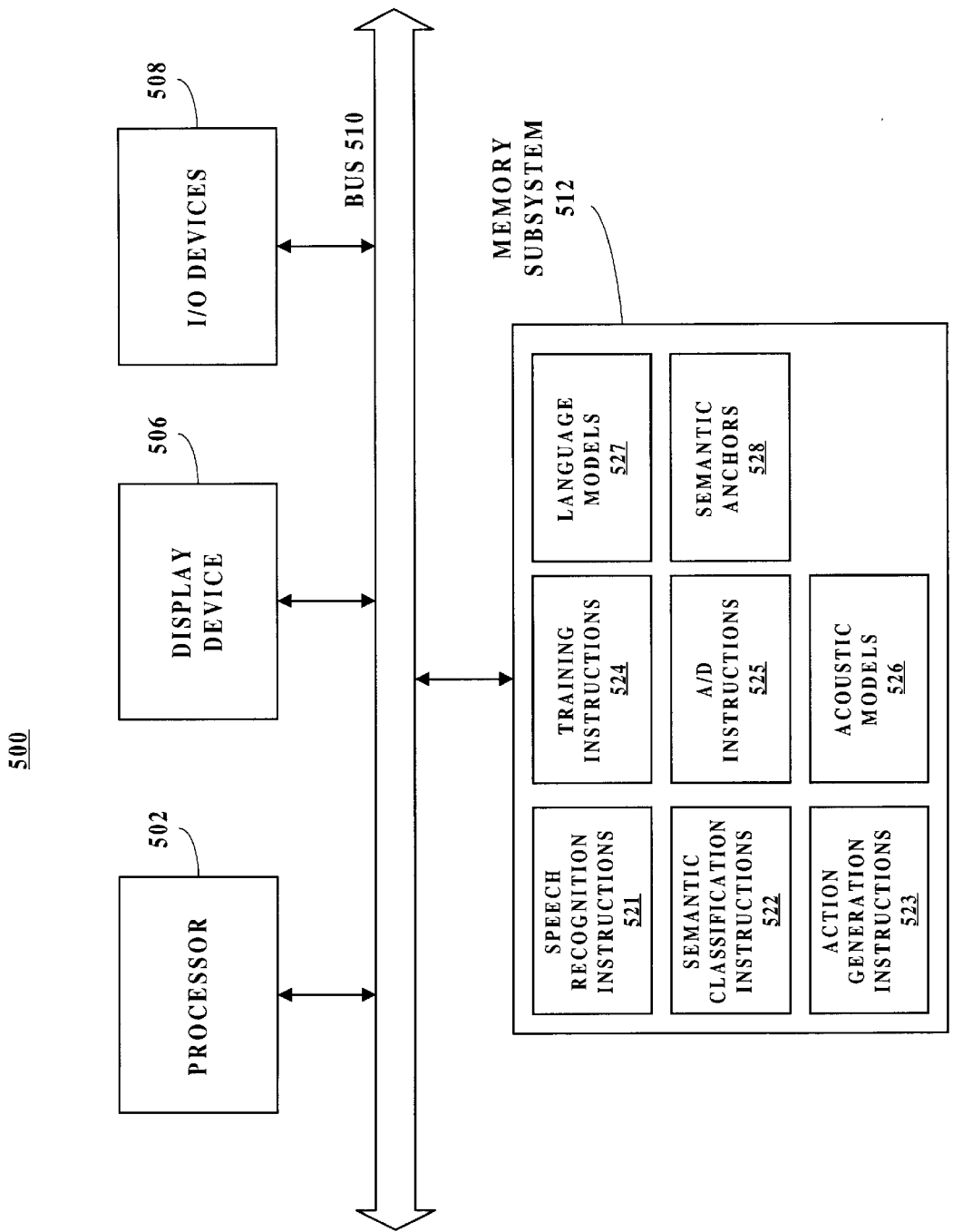
FIG. 5 illustrates one embodiment of a computing device suitable for use with one embodiment the present invention.

FIG. 5 illustrates one embodiment of a computing device suitable for use with one embodiment the present invention. According to one implementation, command recognition system 100 of FIG. 1 is a hardware system 500 of FIG. 5. In the illustrated embodiment of FIG. 5, system 500 includes processor 502, display device 506, and input/output (I/O) devices 508, coupled to each other via a bus 510. Additionally, a memory subsystem 512, which can include one or more of cache memories, system memory (RAM), and nonvolatile storage devices (e.g., magnetic or optical disks) is also coupled to bus 510 for storage of instructions and data for use by processor 502. I/O devices 508 represent a broad range of input and output devices, including keyboards, cursor control devices (e.g., a trackpad or mouse), microphones, speakers, network or telephone communication interfaces, printers, etc. Hardware system 500 also includes well-known audio processing hardware and/or software to transform analog voice data to a digital form which can be processed by system 500.

These elements 502–512 perform their conventional functions known in the art. Collectively, these elements are intended to represent a broad category of hardware systems, including but not limited to general purpose computer systems based on the PowerPC® processor family of processors available from Motorola, Inc. of Schaumburg, Ill., or the Pentium® processor family of processors available from Intel Corporation of Santa Clara, Calif.

It is to be appreciated that various components of hardware system 500 may be re-arranged, and that certain implementations of the present invention may not require nor include all of the above components. For example, a display device may not be included in system 500. Additionally, multiple buses (e.g., a standard I/O bus and a high performance I/O bus) may be included in system 500. Furthermore, additional components may be included in system 500, such as additional processors (e.g., a digital signal processor), storage devices, memories, network/communication interfaces, etc.

In the illustrated embodiment of FIG. 5, the method and apparatus for command recognition using data driven semantic inference according to the present invention as discussed above is implemented as a series of software routines run by hardware system 500 of FIG. 5. These software routines comprise a plurality or series of instructions to be executed by a processor in a hardware system, such as processor 502 of FIG. 5. Initially, the series of instructions are stored on a storage device of memory subsystem 512. It is to be appreciated that the series of instructions can be stored using any conventional storage medium, such as a diskette, CD-ROM, magnetic tape, DVD, ROM, Flash memory, etc. It is also to be appreciated that the series of instructions need not be stored locally, and could be received from a remote storage device, such as a server on a network, via a network/communication interface. The instructions are copied from the storage device, such as mass storage, into system memory and then accessed and executed by processor 502. In one implementation, these software routines are written in the C++ programming language. It is to be appreciated, however, that these routines may be implemented in any of a wide variety of programming languages.

These software routines are illustrated in memory subsystem 512 as speech recognition instructions 521, semantic classification instructions 522, action generation instructions 523, and training instructions 524. Also illustrated are analog to digital (A/D) transformation instructions 525, acoustic model(s) 526, language model(s) 527, and semantic anchors 528.

In alternate embodiments, the present invention is implemented in discrete hardware or firmware. For example, one or more application specific integrated circuits (ASICs) could be programmed with the above described functions of the present invention. By way of another example, recognizer 104, classifier 112, and generator 118 of FIG. 1 could be implemented in one or more ASICs of an additional circuit board for insertion into hardware system 500 of FIG. 5.

In the discussions above, the present invention is described with reference to voice recognition systems. It is to be appreciated, however, that alternate embodiments of the present invention can be used with other types of pattern recognition systems, such as visual rather than audio pattern recognition, handwriting recognition systems (e.g., optical character recognition (OCR)), etc.

It is to be appreciated that the command recognition system of the present invention can be employed in any of a wide variety of manners. By way of example, the command recognition system could be used in conventional personal computers, security systems, home entertainment or automation systems, etc.

Therefore, a command recognition using data-driven semantic inference has been described. An audio input is provided to a speech recognizer that identifies the words in the input. These recognized words are then provided to a semantic classifier that classifies the input as corresponding to a particular command. This classification process is advantageously based on a data-driven semantic representation of the input rather than on a grammar-based approach. The appropriate action, based on the particular command, can then be generated. The data-driven semantic representation of the present invention advantageously allows the present invention to adapt to and accurately identify different command wordings.

Thus, a method and apparatus for command recognition using data-driven semantic inference has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for recognizing a voice command, the method comprising:
   recognizing a sequence of words received as the voice command; and
   using data-driven semantic inference with the recognized sequence of words to recognize the voice command.

2. The method of claim 1, further comprising using the recognized voice command to determine an action to be performed.

3. The method of claim 1, wherein the using comprises:
   generating a vector representation of the recognized sequence of words; and
   comparing the vector representation to a plurality of semantic anchors, wherein each of the plurality of semantic anchors corresponds to one of a plurality of voice commands.

4. The method of claim 3, wherein the using further comprises:
   choosing a semantic anchor of the plurality of semantic anchors that is most similar to the vector representation; and
   classifying the sequence of words as the command that corresponds to the chosen semantic anchor.

5. The method of claim 4, wherein the choosing comprises:
   for each of the plurality of semantic anchors, identifying the similarity between the vector representation and the semantic anchor by calculating the cosine of the angle between the product of the vector representation and a diagonal matrix of singular values and the product of the semantic anchor and the diagonal matrix of singular values; and choosing the semantic anchor of the plurality of semantic anchors that corresponds to the largest cosine value as the semantic anchor that is most similar to the vector representation.

6. The method of claim 3, wherein the vector representation is an indication of how frequently each of a plurality of words occurs within the recognized sequence of words.

7. The method of claim 6, wherein each of the plurality of semantic anchors is an indication of how frequently each of the plurality of words occurs with respect to the corresponding command.

8. The method of claim 3, wherein each of the plurality of semantic anchors represents a plurality of different ways of speaking the corresponding command.

9. A machine-readable medium having stored thereon a plurality of instructions that, when executed by a processor, cause the processor to recognize a voice command by:

recognizing a sequence of words received as the voice command; and using data-driven semantic inference with the recognized sequence of words to recognize the voice command.

10. The machine-readable medium of claim 9, wherein the plurality of instructions further cause the processor to use the recognized voice command to determine an action to be performed.

11. The machine-readable medium of claim 9, wherein the using comprises:

generating a vector representation of the recognized sequence of words; and comparing the vector representation to a plurality of semantic anchors, wherein each of the plurality of semantic anchors corresponds to one of a plurality of voice commands.

12. The machine-readable medium of claim 11, wherein the using further comprises:

choosing a semantic anchor of the plurality of semantic anchors that is most similar to the vector representation; and classifying the sequence of words as the command that corresponds to the chosen semantic anchor.

13. The machine-readable medium of claim 12, wherein the choosing comprises:

for each of the plurality of semantic anchors, identifying the similarity between the vector representation and the semantic anchor by calculating the cosine of the angle between the product of the vector representation and a diagonal matrix of singular values and the product of the semantic anchor and the diagonal matrix of singular values; and choosing the semantic anchor of the plurality of semantic anchors that corresponds to the largest cosine value as the semantic anchor that is most similar to the vector representation.

14. The machine-readable medium of claim 11, wherein the vector representation is an indication of how frequently each of a plurality of words occurs within the recognized sequence of words.

15. The machine-readable medium of claim 14, wherein each of the plurality of semantic anchors is an indication of how frequently each of the plurality of words occurs with respect to the corresponding command.

16. The machine-readable medium method of claim 11, wherein each of the plurality of semantic anchors represents a plurality of different ways of speaking the corresponding command.

17. An apparatus for recognizing a voice command, the apparatus comprising:

a speech recognizer to recognize a sequence of words received as the voice command; and a semantic classifier, coupled to the speech recognizer, to use data-driven semantic inference with the recognized sequence of words to recognize the voice command.

18. The apparatus of claim 17, further comprising:

an action generator, coupled to the semantic classifier, to use the recognized voice command to determine an action to be performed.

19. The apparatus of claim 17, wherein the semantic classifier is further to generate a vector representation of the recognized sequence of words, and compare the vector representation to a plurality of semantic anchors, wherein each of the plurality of semantic anchors corresponds to one of a plurality of voice commands.

20. The apparatus of claim 19, wherein the semantic classifier is further to choose a semantic anchor of the plurality of semantic anchors that is most similar to the vector representation, and to classify the sequence of words as the command that corresponds to the chosen semantic anchor.

21. An apparatus for recognizing a voice command, the apparatus comprising:

means for recognizing a sequence of words received as the voice command; and means, coupled to the means for recognizing, for using data-driven semantic inference with the recognized sequence of words to recognize the voice command.

22. The apparatus of claim 21, further comprising means, coupled to the means for using data-driven semantic inference, for using the recognized voice command to determine an action to be performed.

23. The apparatus of claim 21, wherein the means for using comprises:

means for generating a vector representation of the recognized sequence of words; and means, coupled to the means for generating, for comparing the vector representation to a plurality of semantic anchors, wherein each of the plurality of semantic anchors corresponds to one of a plurality of voice commands.

24. The apparatus of claim 23, wherein the means for using further comprises:

means, coupled to the means for generating, for choosing a semantic anchor of the plurality of semantic anchors that is most similar to the vector representation; and means, coupled to the means for generating, for classifying the sequence of words as the command that corresponds to the chosen semantic anchor.

* * * * *